United States Patent
Yanof et al.

(10) Patent No.: US 7,236,190 B2
(45) Date of Patent: Jun. 26, 2007

(54) DIGITAL IMAGE PROCESSING USING WHITE BALANCE AND GAMMA CORRECTION

(75) Inventors: Arnold Yanof, Tempe, AZ (US); Michael Skow, Mesa, AZ (US); Hung Tran, Chandler, AZ (US); Anoosh Adby, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 902 days.

(21) Appl. No.: 10/284,661

(22) Filed: Oct. 31, 2002

(65) Prior Publication Data

US 2004/0085458 A1    May 6, 2004

(51) Int. Cl.
- H04N 5/228    (2006.01)
- H04N 9/73    (2006.01)
- H04N 9/68    (2006.01)
- H04N 5/208    (2006.01)
- H04N 5/335    (2006.01)
- G06K 9/40    (2006.01)

(52) U.S. Cl. .............. 348/222.1; 348/223.1; 348/252; 348/273; 382/263

(58) Field of Classification Search .......... 348/222.1, 348/223.1, 224.1, 225.1, 229.1, 230.1, 234, 348/237, 254, 255, 256, 272, 273, 280, 281, 348/362, 252; 382/269, 263
See application file for complete search history.

(56) References Cited

U.S. PATENT DOCUMENTS

| | | | |
|---|---|---|---|
| 3,971,065 A | 7/1976 | Bayer | |
| 4,630,307 A * | 12/1986 | Cok | 382/165 |
| 5,198,890 A | 3/1993 | Suga | |
| 5,506,619 A | 4/1996 | Adams, Jr. et al. | |
| 5,541,648 A * | 7/1996 | Udagawa et al. | 348/222.1 |
| 5,557,340 A * | 9/1996 | Millward | 348/627 |
| 5,581,309 A * | 12/1996 | Okino et al. | 348/699 |
| 5,629,734 A | 5/1997 | Hamilton, Jr. et al. | |
| 5,652,621 A | 7/1997 | Adams, Jr. et al. | |
| 6,101,271 A * | 8/2000 | Yamashita et al. | 382/167 |
| 6,192,162 B1 | 2/2001 | Hamilton, Jr. et al. | |
| 6,486,915 B2 * | 11/2002 | Bell et al. | 348/362 |
| 6,697,110 B1 * | 2/2004 | Jaspers et al. | 348/272 |
| 6,958,772 B1 * | 10/2005 | Sugimori | 348/222.1 |
| 6,995,791 B2 * | 2/2006 | Skow | 348/223.1 |
| 7,102,669 B2 * | 9/2006 | Skow | 348/222.1 |
| 7,173,663 B2 * | 2/2007 | Skow et al. | 348/364 |
| 2002/0135682 A1 * | 9/2002 | Tamama et al. | 348/222 |
| 2003/0184659 A1 * | 10/2003 | Skow | 348/223.1 |
| 2003/0218621 A1 * | 11/2003 | Jiang | 345/698 |
| 2004/0085475 A1 * | 5/2004 | Skow et al. | 348/362 |
| 2005/0001912 A1 * | 1/2005 | Hoshuyama | 348/272 |
| 2006/0197847 A1 * | 9/2006 | Johnson et al. | 348/229.1 |

OTHER PUBLICATIONS

Jung, et al., Design of Real-Time Image Enhancement Preprocessor for CMOS Image Sensor, IEEE Transactions on Consumer Electronics, vol. 46, No., Feb. 2000, 8 pages.

* cited by examiner

Primary Examiner—John M. Villecco
(74) Attorney, Agent, or Firm—Joanna G. Chiu; Ranjeev Singh

(57) ABSTRACT

A method and system for digital cameras provides improved automatic exposure control, improved automatic white balance, improved color interpolation, improved automatic gamma correction, and improved progressive edge enhancement. These improvements are preferably implemented in CMOS semiconductor technology for faster speed.

16 Claims, 7 Drawing Sheets

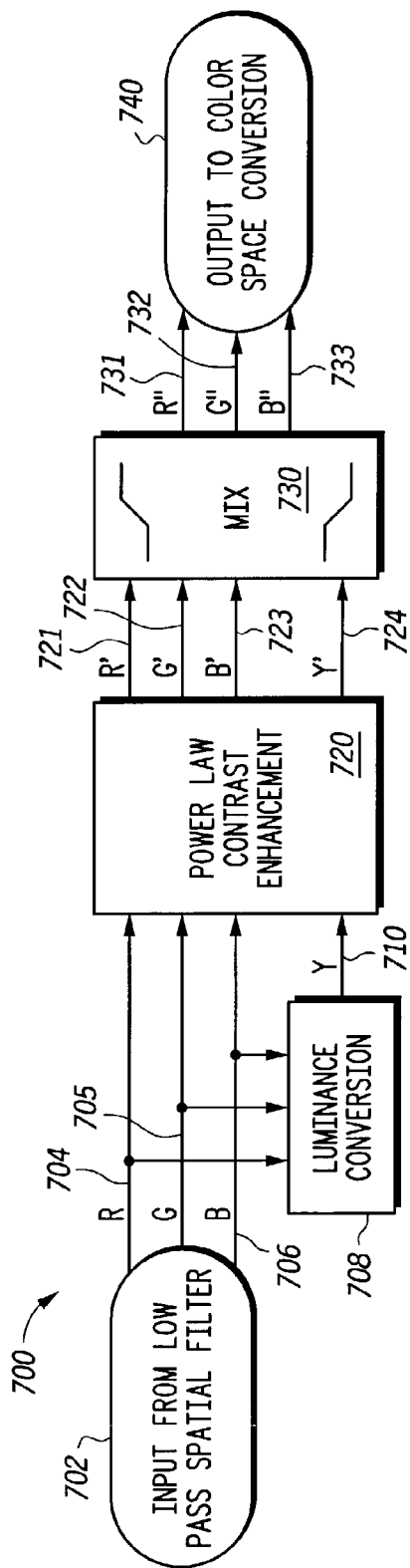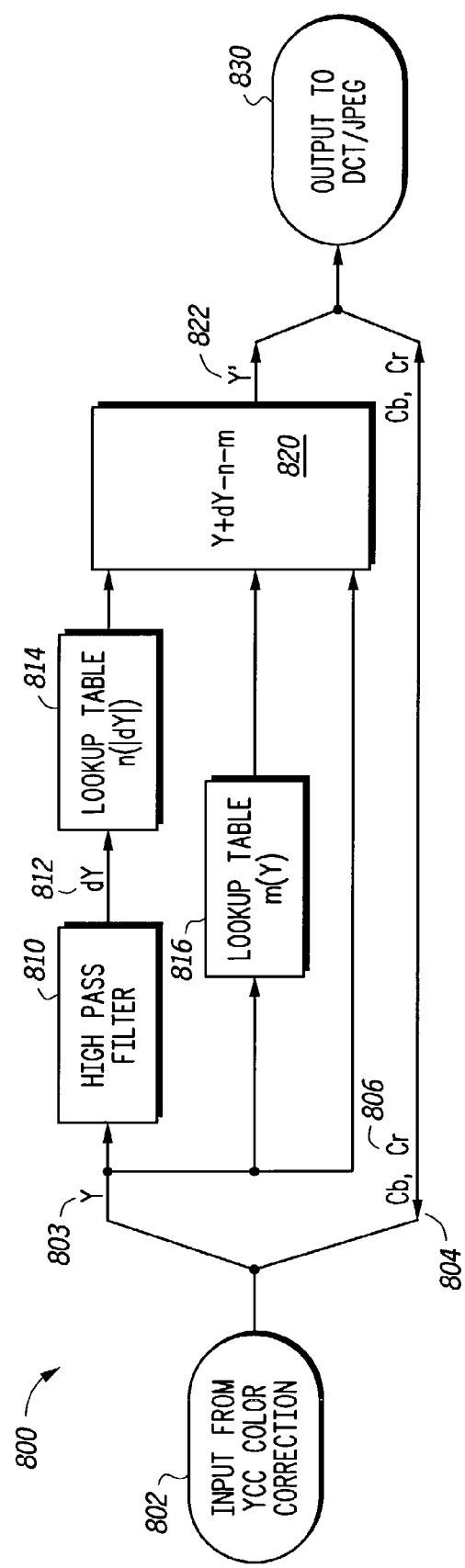

DIGITAL IMAGE PROCESSING USING WHITE BALANCE AND GAMMA CORRECTION

TECHNICAL FIELD OF THE INVENTION

The present invention relates to the field of methods and systems for digital imaging.

BACKGROUND OF THE INVENTION

Digital imaging systems have created a revolution in photography and cameras. A digital camera is similar to a film camera except that the film is replaced with an electronic sensor. The sensor is comprised of an array of photo detectors that change the photons that strike them into electrons providing a signal at each pixel proportional to the number of photons, or the amount of light at each pixel. Presently, most consumer digital cameras employ Charge Coupled Device (CCD) or Complementary Metal Oxide Semiconductor (CMOS) sensors. To facilitate the collection of light, many of the sensors employ a small lens-like structure covering each pixel, which is called a microlens. These microlenses are typically made by forming a layer of photoresist that is placed upon the pixel plane.

The image sensors used in digital imaging are inherently monochrome devices, having no color discriminating ability associated with each detector. For this reason, the sensors typically employ a Color Filter Array (CFA) inserted between the microlens and each active portion of the pixel structure, the photodiode. Typically, the CFA is constructed to assign a single color to each pixel. Digital camera manufacturers often choose among a variety of CFA architectures, usually based on different combinations of primary colors (red, green, blue) or complementary colors (cyan, magenta, yellow). Regardless of the particular CFA used, the overall aim is to transfer only a single color of interest, so that each pixel sees only one color wavelength band.

One of the most popular and ubiquitous CFA patterns is called the Bayer Pattern, which places red, green and blue filters over the pixels, in a checkerboard pattern that has twice the number of green squares as red or blue. The theory behind the Bayer Pattern is that the human eye is more sensitive to wavelengths of light in the green region than wavelengths representing red and blue. Therefore, doubling the number of green pixels provides greater perceived luminance information and detail, while natural color representation for the human eye.

When subjected to light, the image sensor photo diode converts incident photons to electrons. This conversion enables analog electronic circuitry to process the image "seen" by the sensor array. The electrons gathered by these sensors are stored in small capacitors that are read out as a series of varying voltages, which are proportional to the image brightness. An Analog to Digital Converter (ADC) conditions these voltages for processing by a computer within the camera. The data is processed to form a picture of the image "seen" by the sensor array. The sensor is only one part of the digital camera. An associated processor controls the sensor and processes the data from the sensor to achieve high quality output images. The tasks performed by the processor include Automatic Exposure Control (AEC), Automatic White Balance (AWB), color interpolation or "demosaicing", color correction, contrast enhancement and gamma control, and noise reduction. A properly tuned sensor/processor combination results in superior digital camera images.

In many designs, a mechanical shutter is used in the same way that it is used in a film camera—to gate the light that is allowed to reach the sensor or film. Many digital cameras use what is called an electronic shutter, which allows the control of when and for how long the sensor gathers light through electronic control signals to the sensor. Proper design of the automatic exposure control algorithm ensures high quality images.

In a single sensor camera using a color filter array, one type of algorithm implemented by the processor is called a color interpolation or demosaicing algorithm, which is used to derive complete color data for each pixel. Demosaicing algorithms analyze neighboring pixel color values to determine the resulting color value for a particular pixel, thus delivering a full resolution image that appears as if each pixel's color value was derived from a combination of the red, blue, and green primary colors (if RGB colors are used). Thus, the assembled image can exhibit natural gradations and realistic color relationships.

Automatic white balance (AWB) algorithms are used to set the overall color 'tone' of a digital image, correcting for different colors of illumination and for color biases inherent in the sensor. Other types of algorithms specifically for color correction allow the digital data to be further processed to achieve a particular color and intensity (or shade) associated with a specific pixel. Some set a default saturation level high, producing extremely bright, sometimes unnatural colors. Others choose a neutral, more realistic saturation, for greater subtlety and color accuracy. A gamma correction algorithm is used in many digital cameras to tune the image histogram, attempting to make details in both light and dark portions of the image visible.

As digital imaging becomes more prevalent, industry is striving to develop images and video with better resolution and color accuracy. The quality of an image produced by a digital camera can be measured in several ways such as resolution and dynamic range. In the most basic sense, the resolution of a digital camera can be stated to be the total number of pixels used. For example, a camera with a sensor that has 800 by 1000 pixels can be said to have 800,000 pixels of total resolution. As stated, the resolution is a quality of the camera mechanism. In an image, the resolution is the limit of the ability to depict fine lines, sharp edges, and other details in the original scene. Resolution depends on the optical system (lens, filters, etc), the number of pixels, and the manner of processing the digital signal.

The dynamic range relates to both the accuracy of the A/D converter that changes the analog voltage representing a pixel brightness to a digital number. Typical cameras have A/D converters of 10 to 12 bits or 1024 to 4096 different dissemble levels. Better cameras may have higher A/D resolution. The dynamic range is the largest possible signal containing information, divided by the smallest possible signal that is distinguishable from noise, usually expressed in decibels.

The broader the dynamic range of the camera, the easier it is to differentiate small gradations in brightness or color. Noise can come from several different places including optical noise from lens flare, thermal and electronic noise from the power supply, electronic circuitry and the sensor itself. Unique to digital cameras, a large component of the noise is thermally generated within the sensor. Cooling the sensor can reduce this noise but electronically cooling the sensor with a Thermo-Electric (TE) cooler is both expensive and consumes quite a bit of power. In total, the dynamic range will interpret into a digital camera's ability to observe fine gradations in the darkest shadow areas of an image or equivalently in the brightest highlights.

In taking a digital image, one aim is to achieve images in which objects are exposed properly and are not too bright or too dark. Commonly, this is achieved through moving the digital information histogram to an optimal point within the bounds of the maximum and minimum output signal levels of the system. Another related aim is to achieve images that are properly exposed and which exhibit a high signal-to-noise ratio. Stated another way, the aim is to acquire properly-exposed images that do not show many noise artifacts.

There is a continuing need to develop improved digital imaging systems and processes to capture higher quality images and video. It is possible to capture higher quality images and video through improving the digital processes that manipulate the raw data acquired from the photo sensor array. In addition, it is possible to improve the operation of digital image and video systems through streamlining the overall process architecture. CMOS sensors, having many cost, power, and circuit advantages over CCD sensors, tend to have poorer signal-to-noise and dynamic range than CCDs. Improved digital processes are of great value in avoiding unnecessary noise in the final image from a CMOS sensor, and making best use of its available dynamic range.

BRIEF DESCRIPTION OF THE DRAWINGS

FIG. 7 illustrates a block diagram of auto gamma correction.

FIG. 8 depicts a block diagram of progressive edge enhancement.

DETAILED DESCRIPTION OF THE PREFERRED EMBODIMENTS

Figure 1:
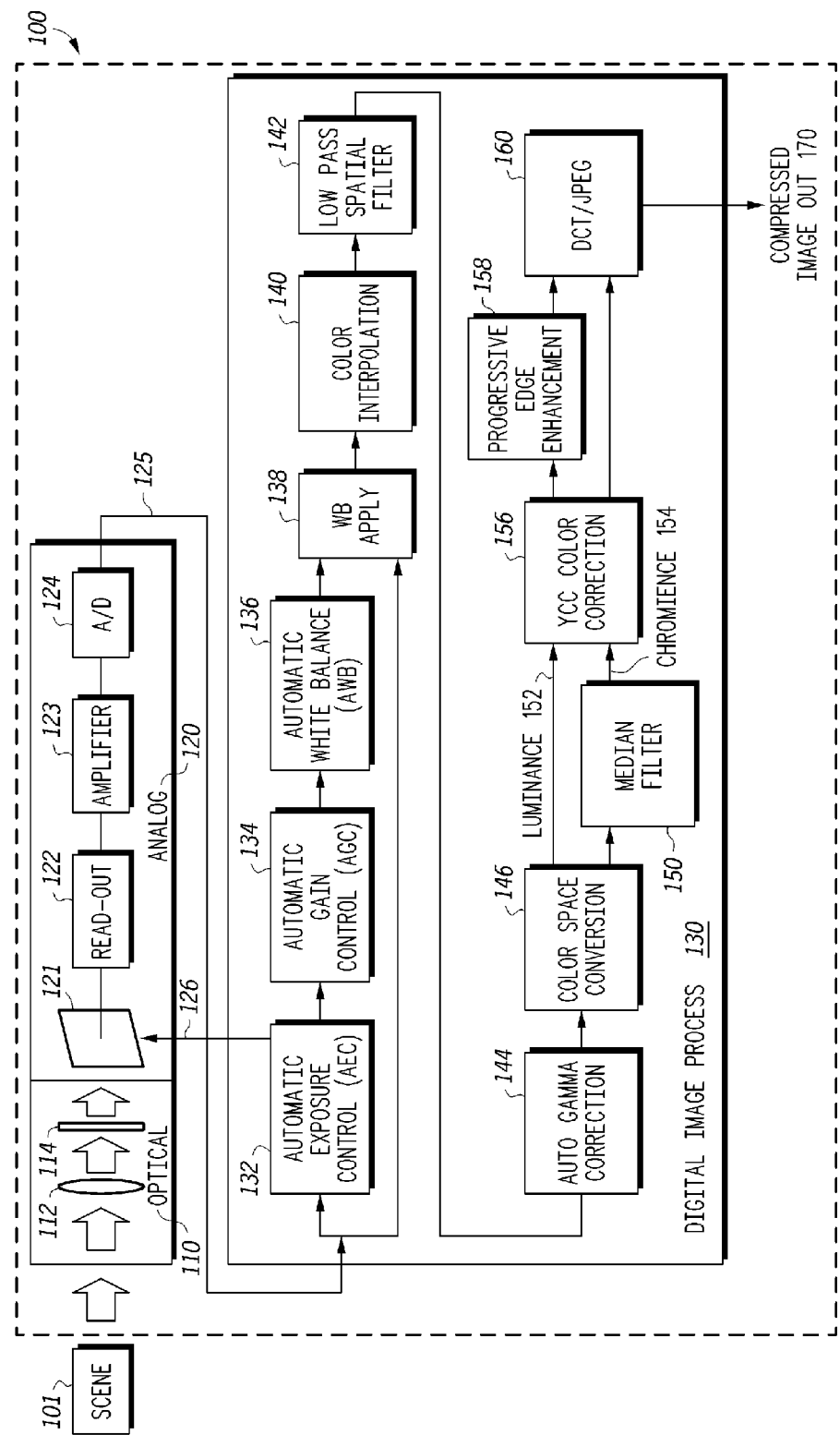
FIG. 1 illustrates a block diagram of a digital camera system including a present preferred embodiment of Automatic Exposure Control (AEC).

FIG. 1 shows camera 100 taking a picture of scene 101. Scene 101 may be of people, animals, plants, scenery, buildings, or a mixture thereof. Camera 100 has three major component sections, an optical section 110, an analog section 120, and a digital image process section 130.

In optical section 110, light from scene 101 is focused by optical lens 112 onto color filter array (CFA) 114. CFA 114 can be a Bayer pattern or another array. The light then enters analog section 120 where it is detected by photo-sensors 121. Photo sensors 121 are a CMOS array. CMOS stands for complementary metal-oxide semiconductor, where pairs of metal-oxide semiconductor field effect transistors (MOSFETs), one N-type and the other P-type, are integrated on a single silicon chip. CMOS devices have high speed and extremely low power consumption. The output of photo-sensors 121 are obtained by read-out 122, amplified by amplifier 123, and then digitized by analog-to-digital (A/D) converter 124.

The output of A/D converter 124 enters digital image process 130 via line 125. The output of A/D converter 124 is fed to both Automatic Exposure Control (AEC) 132 and White Balance (WB) apply 138. Automatic exposure control 132 is further discussed in FIG. 2. The output of automatic exposure control 132 is fed to Automatic Gain Control (AGC) 134, and fed back to photon sensors 121 via feedback path 126 to control the exposure time. AGC 134 includes an amplifier that boosts the output of WB 138 for further processing. Based upon the level of exposure, AGC 134 automatically adjusts the level of gain applied by the amplifier to the acquired signal. The output of automatic gain control 134 is fed to automatic white balance (AWB) control 136. Automatic white balance 136 is further discussed in FIG. 3. Then the output of automatic white balance control 136 as well as the output of analog-to-digital converter 124 is fed into WB 138. WB 138 simply obtains multipliers for red, green and blue from the white balance step, and multiplies them by each of the red, green and blue pixel values, respectively.

The output of WB 138 is fed into color interpolation 140. Color interpolation 140 is further discussed in FIG. 6. The output of color interpolation 140 is fed into low-pass spatial-filter 142. Low-pass spatial-filter 142 can perform a low pass filter on three color planes, eliminating Fixed Pattern Noise (FPN) in a flat field before a saturation process. The output of low-pass spatial-filter 142 is fed into auto-gamma control 144. Auto-gamma control 144 is further discussed in FIG. 7. The output of auto-gamma control 144 is fed into color space conversion 146. The output of color space conversion 146 is luminance 152 and, after passing through median filter 150, chrominance 154. The luminance 152 and chrominance 154 are the inputs for YCC color correction 156.

Color Space Conversion 146 uses a linear transformation to change R, G, B components into luminance (Y) and chrominance (Cr, Cb) components. The luminance component contains the bright-and-dark contrast information of the image. Cb contains the blue versus green information. Cr contains the red versus green information. Median filter 150 smooths out noise in the Cb and Cr color channels by considering the Cb or Cr values of a central pixel and its neighbors, and assigning the median value of Cb or Cr, respectively, to the central pixel. YCC color correction 156 changes the saturation and hue of the color of each pixel. It performs this transformation in YCC color space. At each pixel location, new Y, Cb, and Cr are calculated, based on the existing values of Y, Cb, and Cr. This usually results in colors, which are brighter, and more accurately represent the original scene.

One output of YCC color correction 156 goes directly to discrete cosine transform (DCT) and Joint Photographic Experts Group (JPEG) compression algorithm 160. The other output of YCC color correction goes to progressive edge enhancement 158. Progressive edge enhancement 158 is further discussed in FIG. 8. The output of progressive edge enhancement 158 goes into to discrete cosine transform (DCT) and (JPEG) compression algorithm 160. The output of DCT/JPEG 160 is the compressed image out 170. The DCT function converts the observable image into an "image" of equivalent size but in the spatial frequency domain. This conversion separates low spatial frequencies (slowly changing color/light level portions of the image like sky background) from higher spatial frequencies (quickly changing portions of the image like leaves on trees). The JPEG algorithm then compresses this image data by preferentially encoding the lower frequency portions of the image, and eliminating some of the highest frequency portions. In many cases, compression can be realized to reduce the image storage size by 10:1 or more that will have no visible impact on the image quality. The JPEG compressed output image will typically go to a file storage medium within the camera system. Such storage media can take the form of an integrated semiconductor memory, a removable media system (like Multi-media Card (MMC)), or a download to a computer network via physical connection (like Universal Serial Bus (USB)) or wireless connection (cellular).

Figure 2:
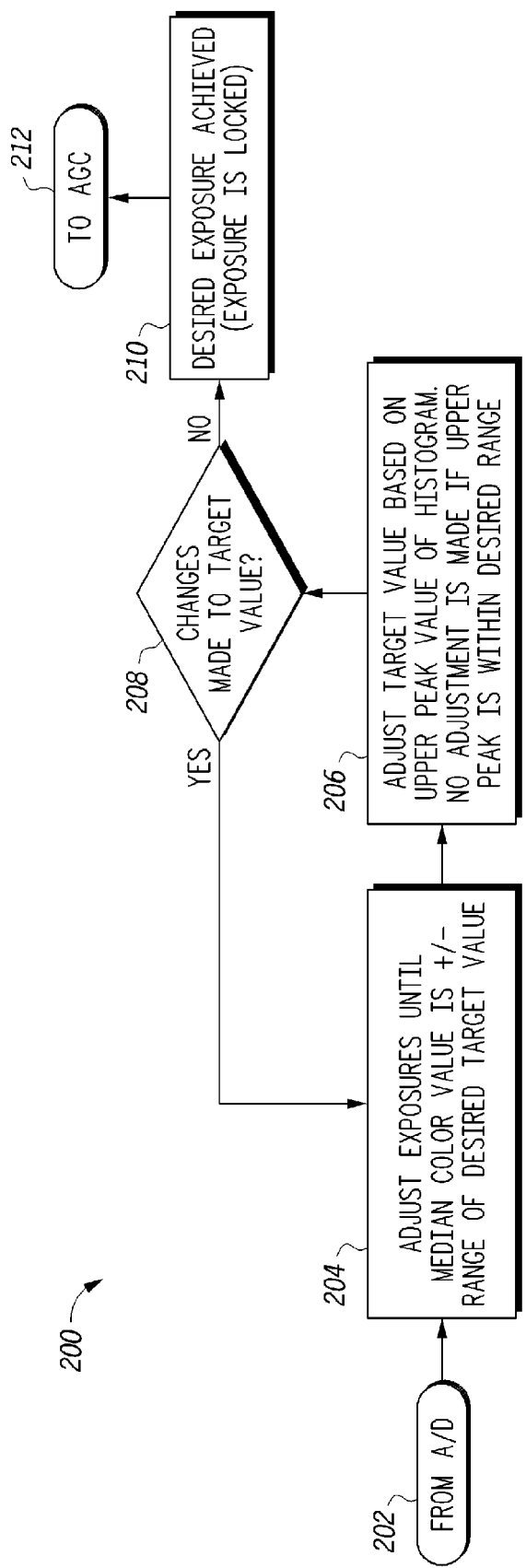
FIG. 2 illustrates a flowchart of a present preferred embodiment of Automatic Exposure Control (AEC).

In FIG. 2, the flowchart 200 of the operation of automatic exposure control 132 is shown. This automatic exposure control (AEC) 132 uses two major steps, steps 204 and 206 to refine the exposure level of the sensor system to a desired level. The desired exposure level is a level of exposure where the image captured by photo-sensor array 121 is visually appealing. AEC 132 determines the desired exposure level by comparing an image histogram of the acquired image to a stored expected histogram. The image histogram is a digital representation of the image that is acquired by photo-sensor array 121. The expected histogram is a digital representation of an ideal image stored in memory that has a visually appealing level of exposure. Through comparing and adjusting the image histogram to the expected histogram is it possible to provide the acquired image with a desired exposure level to make the image visually appealing. As previously stated, the exposure of a system can be modified electronically by changing the time period in which the photo diode array 121 collects and converts photons to electrons. This time period is called the 'integration time'. The desired exposure level can be defined by the image histogram of all pixels occupying all possible codes within the available dynamic range. Stated another way, the goal of system 132 is to create the largest signal (create a better signal to noise ratio) without over-exposing the image.

To perform AEC 132, a variable target value is used to compare the output level from the photo-sensor array 121 to an expected histogram. This target value is first set to a specific level and the median output of the sensor system is compared to this specific level. The mean value is often used as median, which is generally superior, but takes more processing power to calculate. The exposure time, which is also known as the integration time, is adjusted up or down to change the output median value closer to this expected histogram. With AEC 132, an exposure is made, photo sensors 121 capture the image, AEC 132 then compares the captured image to the expected histogram, and as a results of this comparison may change the integration time "loop" to progressively move the exposure closer to the desired target value. In each successive frame, the exposure will become more ideal as the integration time is changed proportionally to and in the direction of the desired output exposure level.

This iterative method between steps 204 and 206 is specifically designed to compensate for differences in an image histogram that occur due to extremes in lighting conditions and high noise environments of CMOS image sensors. The image histogram is a plot of the number of pixels that have a specific output value versus the possible output values. The creation of the image histogram involves placing the output pixel occurrences into bins for quantization. This "binning" of the output pixel occurrences does not attempt to rationalize the order or position the pixels were in, but instead shows the relative illumination of the output compared to the possible dynamic range. In outdoor and other high illumination environments, it is most common to have large differences in photon sensor 121 outputs within an image. These differences typically take the shape of a bimodal distribution of the resulting image histogram and this image histogram has little trouble occupying much or all of the available output dynamic range. Conversely, in indoor or lower light environments, the delta between light and shadow photon sensor 121 outputs is much less, often resulting in a unimodal image histogram distribution. In extreme cases, this unimodal image histogram can be very narrow, using only a small portion of the output dynamic range.

Accommodation of both of the above extremes is made more difficult by the high noise environment of a CMOS image sensor 121. To compare other portions of the image histogram to expected levels in the expected histogram, measurements must be statistically significant and not part of the noise output of sensor 121. Previously, the minimum and maximum numbers used in this sort of comparison were not very helpful in the presence of significant noise and defect pixels. Therefore, a new method (FIG. 2) of comparison using a target value on the image histogram is employed.

The process begins with the output of analog-to-digital converter 202. In step 204, the exposure is adjusted until the median color value is within some small error range of the desired Target Value (TV), on the expected histogram. In step 204, the initial specific median value target of 22% may be used. While the median value is preferred due to its accuracy, the mean value can be substituted. The trade off is that with the mean value there is lower accuracy, but it also requires lower system processing power. The percentage indicates the percent of the total dynamic range that the median value should approach. For example, if an 8 bit system is used, there are 256 total code values in the dynamic range. 22% target value (TV) would indicate that it is desired to have the median output value be 56 codes on this scale. Lower target values may be employed to increase color depth at the expense of exposure (which means lower signal to noise ratio). Higher target values (TV) increase the signal to noise ratio by increasing the exposure, but somewhat at the expense of color depth. This means that the median value of the image histogram is ideally this target value value within some small percentage error range. The error range (E) may be initially set at within 5% of the target value value. Upon measurement and test of this average value, if it is not near this target value, then the photon sensor 121 exposure time is changed proportionally up or down to move the output toward this desired target value.

In greater detail, step 204 uses as input the highest median color of either red, green or blue. The target value (TV) is given as a percentage of the dynamic range. The error range (E) is also a percentage, typically 5%. The upper and lower range of the TV are calculated based on the dynamic range of the data.

$U\ TV = \text{Upper Range} = TV + E*TV$ $L\ TV = \text{Lower Range} = TV - E*TV$ If the median is greater than U TV, then lower the exposure time. If the median is less than L TV, increase the exposure time. If (L TV<=median<=U TV), then step 204 is completed and proceeds to step 206.

Step 206 involves the use of near upper peak of the image histogram, and a comparison to near an upper peak in the dynamic range. If the upper peak is not within a specified boundary of the output dynamic range, the exposure target is increased (if not a maximum) or decreased (if not at a minimum). The process then returns to step 204 of comparing the image histogram output median. Again, mean values can be substituted, although not as accurately, into this equation to reduce system processing power requirements.

Step 206 compares the upper peak value of the image histogram to a high point of the output dynamic range. To prevent noise form affecting the measurement, typically the $95^{th}$ to $98^{th}$ percentile of the histogram is used for comparison. This data point is then compared to a predetermined percentage of the output dynamic range. The specific output limit (OL) value used for this comparison might be 90% of the dynamic range. As an example, using the same 8 bit system with 256 output codes possible, it is desirable to have the $95^{th}$ percentile of the image histogram to be greater than the OL code value 230 (90% of the output range of 255). If the $95^{th}$ to $98^{th}$ (one specific number is used) of the image histogram is greater than this OL then the value for step 204 was appropriate. If it was appropriate, then algorithm 200 is considered settled or locked in step 210. A locked condition in step 210 changes the acceptable error range (E) of step 204 to make it more likely for the image to also be acceptable, if the next image is captured under similar lighting conditions. The value of E in this case might change from the original ±5% of the target value to ±10% of the target value. No updates to the image sensor 121 exposure time, also known as integration time, are made while the AEC algorithm 200 is in the locked condition. When the value of E is exceeded (either positively or negatively) the algorithm becomes unlocked, and E is again reduced to the original value that may be 5%.

If comparison of the percentile of the histogram in step 206 shows that the target in step 204 was not appropriate, then the target value is moved up or down a fixed amount. The target value (TV) might move up or down 3% for each iterative step that the comparison shows it was not an appropriate value. As an example, if the initial target value was to have the output histogram median value at 22% of the dynamic range, and $95^{th}$ percentile is lower than the OL value, it is desirable to increase the target value from 22% of the dynamic range to 25% of the dynamic range. Then the process flows back to step 204 in an iterative manner.

The output of step 206 goes to decision step 208, where the determination is made whether there was a change or adjustment to the target value in step 206. If there was a change to the target value in step 206, the process flows back to step 204, where the exposure is further adjusted. However, if there was no change in the target value in decision step 206, the process flows to step 210 where the desired exposure has been achieved and the exposure is locked. The process then flows from step 210 to step 212, where the output of the automatic exposure control goes to automatic gain control 134.

Step 206 preferably uses the $98^{th}$ percentile of the image histogram. Trade offs exist between a higher percentile resulting is a more optimal exposure time, and a lower percentile (95%) resulting is a somewhat faster 'convergence' time until the algorithm is locked. In step 206, find the peak value in terms of the percentage of dynamic range.

Figure 3:
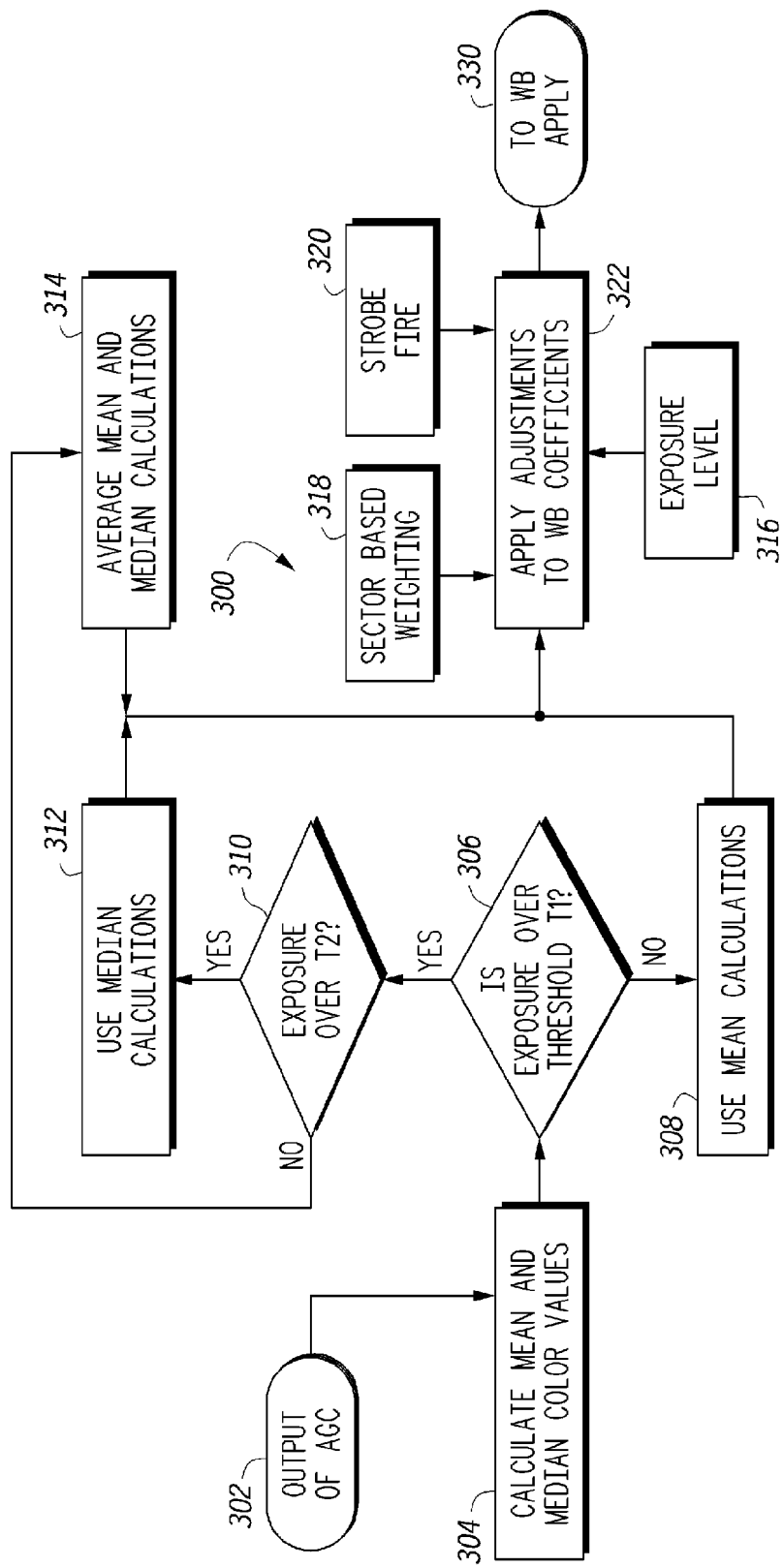
FIG. 3 illustrates a flowchart of Automatic White Balance (AWB).
Figure 4:
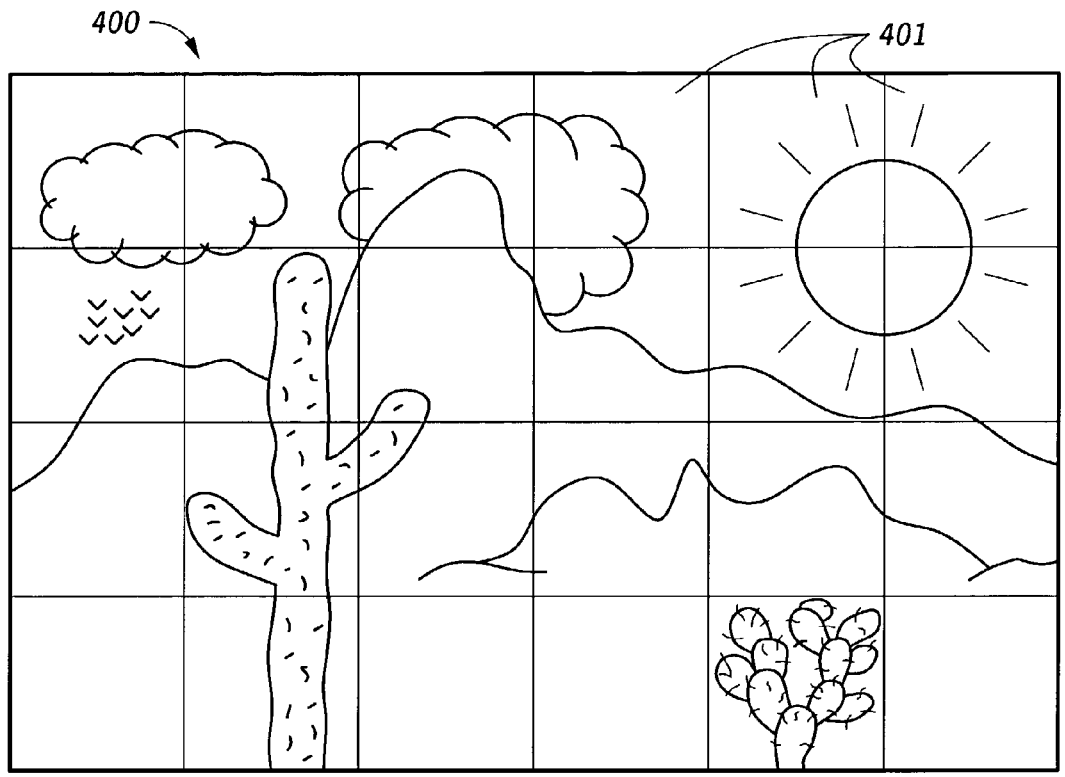
FIG. 4 depicts an image divided into sectors.

In FIG. 3, flowchart 300 of automatic white balance 136 is shown. The automatic white balance 136 may calculate a gray world model ratio of the colors in a Bayer (or other CFA) pattern, applying a constant multiplier to each color. The process begins in step 302, with the receipt of the output of AGC 134. The process flows from step 302 to step 304, where the mean and median color value statistics are calculated for each sector of the image. FIG. 4 shows an image 400 divided into sectors 401. The mean color value statistics calculated in step 304 are R_mean, G_mean, g_mean, and B_mean for each sector in FIG. 4. The highest mean is ascertained from the individual sector means. The median color value statistics calculated in step 304 are R_median, G_median, g_median, and B_median for each sector in FIG. 4. The highest median is ascertained from the individual sector medians. It should be noted that the mean, which is equally known as the arithmetic mean, is simply the sum of all values divided by the total number of values. The median is simply the middle value. For example, for the set of numbers {1, 1, 2, 3, 13}, the mean is 4 (20/5) and the median is 2 (the middle number). G and g are treated separately because green pixels in the blue rows (G) have a slightly different response from green pixels in the red rows (g). The reason is the possibility of crosstalk between pixels, an inequality in the g and G pixel sizes, or various other reasons which may or may not apply to a given sensor producing an image. "g" (green on a blue row) should be treated just like red, blue, and green on a red row. Its white balance coefficient is calculated in the AWB process and it is an input to the AWB algorithm.

The process flows from step 304 to step 306. The outputs of steps 306 and 310 will determine whether the mean, median, or combination thereof is used to interpolate color. For example, for indoor shots, which are usually darker than outdoor shots, the histogram of the image will shift to the low end. Any bright spots in the scene such as light sources will skew the mean value higher. In this condition, the mean value is not fully representative of the color level because of the skewing. In this case, the statistical median value is a better representative.

For outdoor shots, the histogram of the image is usually distributed across the histogram. The median value is not a good representative because any dark spots in the image such as shades or shadows will skew the median to the low end. In this case, the mean value better represents the wide distribution of the histogram. For images taken between outdoors and indoors, an average of the mean and median is used.

In step 306, the determination is made whether the exposure is over a threshold T1. If in step 306 the exposure is not over threshold T1, the process flows to step 308 where the mean color value statistics are used to calculate the initial Gray World white balance multipliers:

RWB_multiplier_initial=Highest_mean/R_mean gWB_multiplier_initial=Highest_mean/g_mean GWB_multiplier_initial=Highest_mean/G_mean BWB_multiplier_initial=Highest_mean/B_mean and the process flows to step 322 where the white-balance adjustments are applied to the initial white balance multipliers. The preferred value of T1 is 50 milliseconds.

If in step 306 the exposure is over threshold T1, the process flows to step 310, where the determination is made whether the exposure is over a second threshold T2. If the exposure is over second threshold T2, the process flows to step 312 where the initial Gray World white-balance multipliers are calculated using median color value statistics:

RWB_multiplier_initial=Highest_median/R_median gWB_multiplier_initial=Highest_median/g_median GWB_multiplier_initial=Highest_median/G_median BWB_multiplier_initial=Highest_median/B_median and the process flows to step 322 where the white-balance adjustments are applied to the initial white balance multipliers.

However, in determination step 310, if the exposure is not over threshold T2, the process flows to step 314, where the 312 where the initial white-balance multipliers are calculated using the average of the mean and median color value statistics:

RWB_multiplier_initial=[Highest_mean/R_mean+
Highest_median/R_median]/2 gWB_multiplier_initial=[Highest_mean/g_mean+
Highest_median/g_median]/2

GWB_multiplier_initial=[Highest_mean/G_mean+
Highest_median/G_median]/2

BWB_multiplier_initial=[Highest_mean/B_mean+
Highest_median/B_median]/2 and the process flows to step 322 where the white-balance adjustments are applied to the initial white balance multipliers. In step 314, the division by two is preferably a single binary bit shift. The preferred value of T2 is 80 milliseconds.

In step 322, adjustments are applied to the initial white-balance coefficients:

RWB_multiplier_final=RWB_multiplier_initial*RsecAdj*
RexpAdj*RstrobeAdj gWB_multiplier_final=gWB_multiplier_initial*gsecAdj*
gexpAdj*gstrobeAdj GWB_multiplier_final=GWB_multiplier_initial*GsecAdj*
GexpAdj*GstrobeAdj BWB_multiplier_final=BWB_multiplier_initial*BsecAdj*
BexpAdj*BstrobeAdj based on exposure adjustments from exposure level step 316, sector adjustments from sector based weighting step 318, and strobe adjustment factors from strobe fire step 320. The process then flows from step 322 to white-balance apply 330.

Exposure color compensation adjustments are calculated in step 316 to compensate for any non-linear color response of any particular color on the sensor. For example, for one CMOS sensor technology, blue color response tends to be higher than other color at very low exposure time (<20 milliseconds) indicating a very bright scene. At long exposure time, blue color response is lower than other colors, indicating a very dark scene. Step 316 uses a Look Up Table (LUT), shown as Table 1, that is derived from color response tests based on different exposure levels. The values of Exposure_Comp_Table in Table 1 are a function of exposure time in milliseconds (ms) and color, and the notation Exposure_Comp_Table(time, color) is used.

TABLE 1

| Exposure_Comp_Table(time, color) | | | | |
|---|---|---|---|---|
| | R | G | g | B |
| 10 ms | 1 | 1 | 1 | 0.9 |
| 50 ms | 1 | 1 | 1 | 0.95 |
| 100 ms | 1 | 1 | 1 | 1 |
| 150 ms | 1 | 1 | 1 | 1.02 |

In step 316, the following pseudo code is used to determine the compensation factors GexpAdj, gexpAdj, RexpAdj, and BexpAdj.

```
If Exposure ≤ 10 ms {
    GexpAdj = Exposure_Comp_Table(10 ms, G)
    gexpAdj = Exposure_Comp_Table(10 ms, g)
    RexpAdj = Exposure_Comp_Table(10 ms, R)
    BexpAdj = Exposure_Comp_Table(10 ms, B)
}
Else If Exposure ≤ 50 ms {
    GexpAdj = Exposure_Comp_Table(50 ms, G)
    gexpAdj = Exposure_Comp_Table(50 ms, g)
    RexpAdj = Exposure_Comp_Table(50 ms, R)
    BexpAdj = Exposure_Comp_Table(50 ms, B)
}
Else If Exposure ≤ 100 ms {
    GexpAdj = Exposure_Comp_Table(100 ms, G)
    gexpAdj = Exposure_Comp_Table(100 ms, g)
    RexpAdj = Exposure_Comp_Table(100 ms, R)
    BexpAdj = Exposure_Comp_Table(100 ms, B)
}
Else {
    GexpAdj = Exposure_Comp_Table(150 ms, G)
    gexpAdj = Exposure_Comp_Table(150 ms, g)
    RexpAdj = Exposure_Comp_Table(150 ms, R)
    BexpAdj = Exposure_Comp_Table(150 ms, B)
}
```

The sector adjustments BsecAdj, GsecAdj, gsecAdj, and RsecAdj are calculated in sector weighting step 318. Bw, Gw, gw, and Rw denotes how many sectors blue [B], green of red [G], green of blue [g], and red [R] respectively won in percentage of the total number of sectors in image 400 of FIG. 4. BsecAdj, GsecAdj, gsecAdj, and RsecAdj denote the compensation factor made to the respective color in percentages, which is shown as a decimal number for ease of use in the numerical calculations in step 322.

```
If Bw > 15% {
    If Gw < 10% {
        If Rw > 98% {
            //Red dominates. Depress other colors.
            BsecAdj = 0.99, GsecAdj = 0.98, gsecAdj = 0.98
        }
    }
    Else if Gw < 20% {
        //Green weakly dominates. Depress other colors.
        BsecAdj = 0.98, RsecAdj = 0.95
    }
    Else if Gw < 40% {
        //Green dominates. Depress other colors.
        BsecAdj = 0.95, RsecAdj = 0.90
    }
    Else {
        //Green strongly dominates. Depress other colors.
        BsecAdj = 0.90, RsecAdj = 0.85
    }
}
Else if Bw < 40% {
    //Blue dominates. Depress other colors.
    GsecAdj = 0.95, gsecAdj = 0.95, RsecAdj = 0.90
}
Else {
    //Blue strongly dominates. Depress other colors.
    GsecAdj = 0.90, gsecAdj = 0.90, RsecAdj = 0.85
}
```

Strobe fire step 320 negates the effect of strobe illumination light. Due to the fact that strobe light consists mostly of blue color, the blue color in the image must be adjusted. If this is not done, the image can turn out bluish. Strobe fire step 320 depresses the color that is dominant in the strobe light by applying a factor of less than unity. Strobe fire step 320 provides the following RstrobeAdj, gstrobeAdj, GstrobeAdj, and BstrobeAdj factors per the following pseudo code:

```
        GstrobeAdj = 1
        gstrobeAdj = 1
        RstrobeAdj = 1
        BstrobeAdj = 1
If Strobe Fired {
        BstrobeAdj = 0.90    //Depress blue to 90% if strobe fired.
```

G and g are treated separately because green pixels in the blue rows (G) have a slightly different response from green pixels in the red rows (g). The reason is the possibility of crosstalk between pixels, an inequality in the g and G pixel sizes, or various other reasons which may or may not apply to a given sensor producing an image. White balance compensates for the non-whiteness of lighting, for example tungsten lighting, as well as any such differences in the average sensitivity of the different color pixels. The result of AWB 136 is a set of four numbers, referred to as the white balance multipliers, which need to be multiplied by the raw image signals to bring them into balance. WB Apply 138 is the actual point in the flow at which the multiplication is performed. All G pixel data are multiplied by the G white balance multiplier, all g pixel data are multiplied by the g white balance multiplier, and so forth for R and B. The remainder of the image process flow does not affect the white balance any further.

Figure 5:
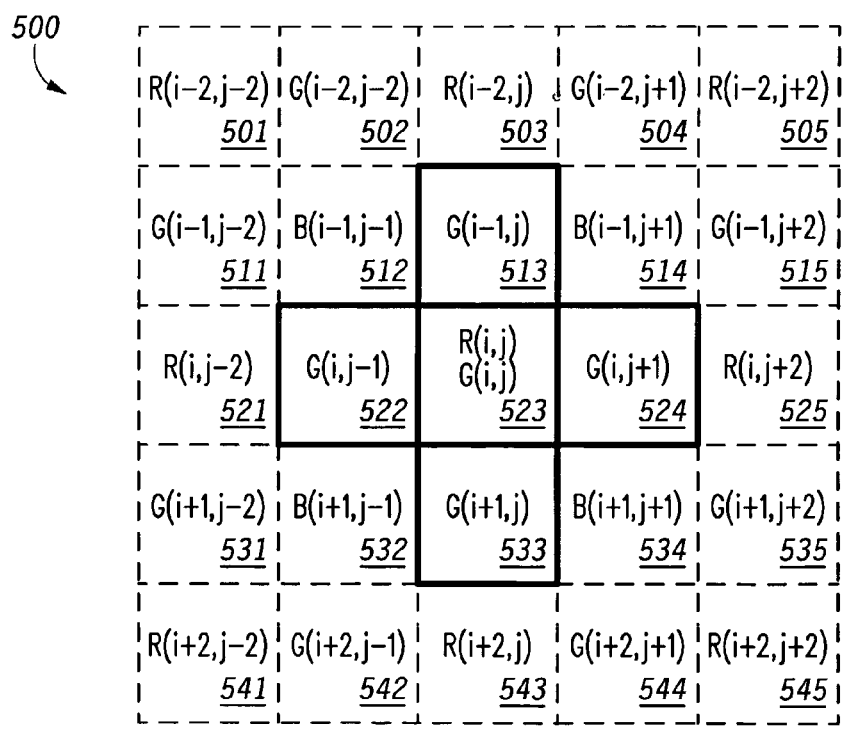
FIG. 5 depicts a Bayer matrix of red, blue, and green pixels.
Figure 6:
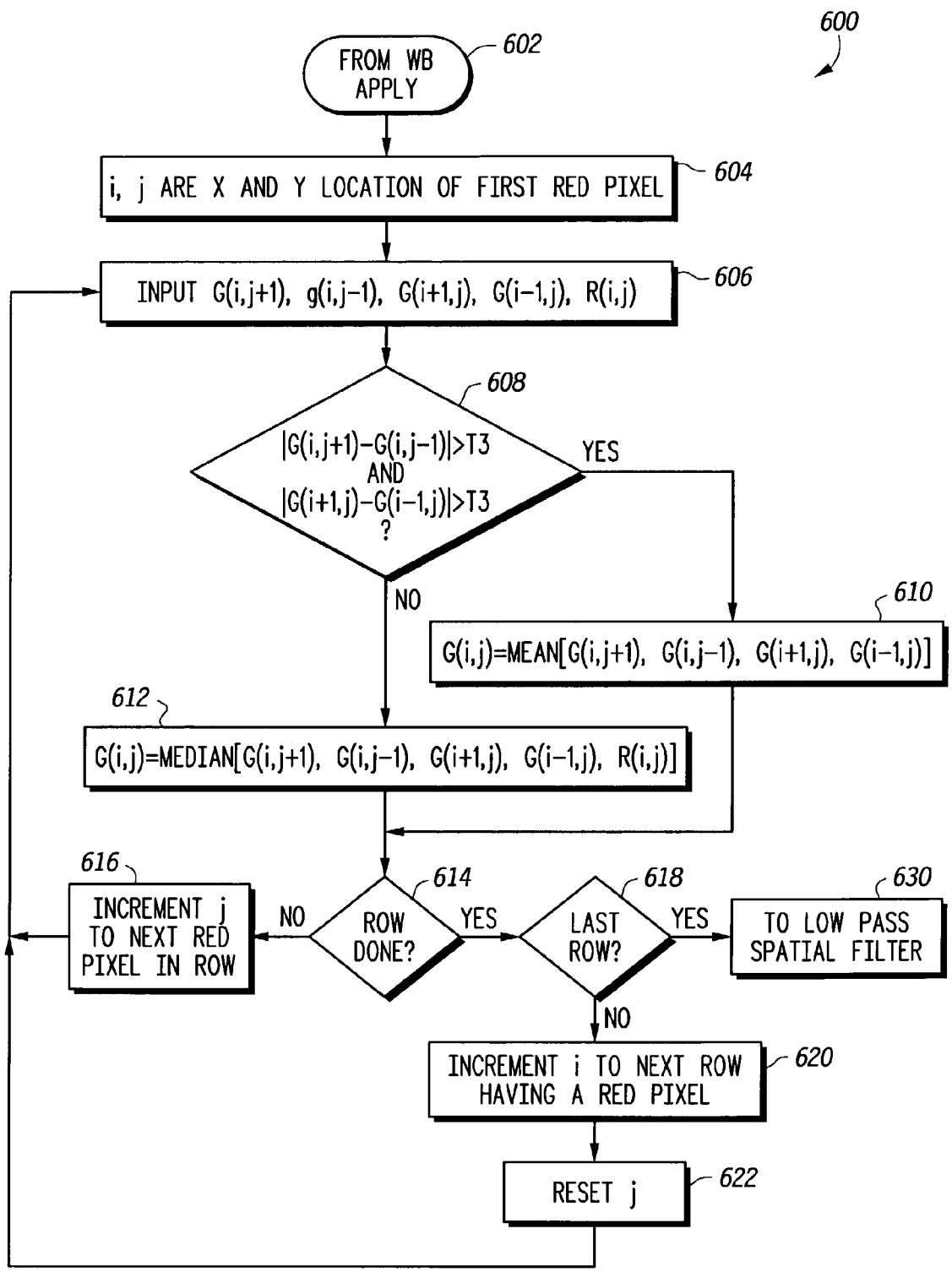
FIG. 6 illustrates a flowchart of color interpolation.

FIG. 5 shows pixel array 500 which is used by color interpolation algorithm 600 of FIG. 6. Pixel array 500 has red pixels 501, 503, 505, 521, 523, 525, 541, 543, and 545. Pixel array 500 has green pixels 502, 504, 511, 513, 515, 522, 524, 531, 533, 535, 542, and 544. Pixel array 500 also has blue pixels 512, 514, 532, and 534. For case of tracking each pixel, each pixel has an row i and column j coordinate.

Color interpolation algorithm 600 is entered from white-balance apply 138 of FIG. 1. Color interpolation must assign a red, green, and blue value to every pixel location. First consider green pixels. At green pixels, the assigned value of green is just the value of the pixel. The assigned value of red is the average of the two nearest red pixels. For example, r(i,j-1)=[R(i,j-2)+R(i,j)]/2. Similarly, the assigned value of blue is the average of the two nearest blue pixels. Next consider red pixels. (The calculation will be completely analogous for blue pixels). At red pixels, the assigned value of red is just the value of the pixel. The assigned value of blue is the average of the four nearest blue pixel values. For example, b(i,j)=[B(i-1, j-1)+B(i-1,j+1)+B(i+1,j-1)+B(i+1,j+1)]/4. The assigned value of green is determined as follows. The process flows to step 604, where i and j are the x and y location (row and column location) of the first red pixel R(i, j). The process flows to step 606, where the values of G(i-1,j), G(i+1,j) G(i,j-1), and G(i,j+1), and R(i,j) are input. The process then flows from step 606 to decision step 608, where the determination is made whether |G(i+1,j)-G(i-1,j)|>T3 and |G(i,j+1), and G(i,j-1)|>T3. T3 is a threshold with a preferred value of 25, assuming a range of possible pixel values 0-255. Code differences of 15-100 are detectable in areas of detail in an image. Too high values for threshold result in jagged diagonal edges. Too low values of threshold result in loss of detail in horizontal and vertical lines, due to unnecessary averaging. The purpose of decision step 608 is to detect a diagonal edge. A diagonal edge is detected when there is a significant change in color intensity in both the row (horizontal) and vertical (column) of pixel array 500. If a diagonal edge is detected, the process flows to step 610 where green pixel G(i,j) is calculated as the mean of G(i-1,j), G(i+1,j) G(i,j-1), and G(i,j+1).

$$G(i,j)=[G(i-1,j)+G(i+1,j)+G(i,j-1)+G(i,j+1)]/4$$

The division by four is preferably done by two binary bit shifts.

If in step 608, the determination is negative, the process flows to step 612, where green pixel G(i,j) is calculated as the median of [G(i-1,j), G(i+1,j) G(i,j-1), G(i,j+1), R(i,j)].

After completing step 612, the process flows to step 614 where its is determine if the process has finished the calculations for the entire row. If it has not finished the calculations for the entire row, the process proceeds to step 616 where it increments j to the next red pixel in the row. Then, after incrementing j, the process flow back to step 606.

If the row is completed, the process flows from step 614 to step 618 where the process determines if the completed row is the final row. If the completed row is not the final row, the process flows to step 620 where i is incremented to the next row having a red pixel. After i is incremented, j is reset in step 622 and the process flows to step 606. If in step 618 it is determined that the completed row is also the final row, then the process proceeds forward by outputting the data to low pass spatial filter 142 in step 630. Low-pass spatial-filter 142 can perform a low pass filter on three color planes, eliminating Fixed Pattern Noise (FPN) in a flat field before a saturation process. The output of low-pass spatial-filter 142 is fed into auto-gamma control 144.

FIG. 7 shows automatic gamma correction 700. Automatic gamma correction 700 can perform a variable gamma correction to increase a perceived dynamic range of a image. Gamma correction 700 takes R, G, and B as inputs 702 from the low pass spatial filter 142. R, G, and B, are basically the numerical values of R, G, and B pixels you would need in a display device to produce a required color. They have values between 0 and 255. Many image processing software types allow you to mouse over an image and see the R, G, and B values at every point. In a computer, these digital values are sent to the video card, which generates voltages to run the CRT monitor. Raising the voltage values increases the extraction of electrons from the CRT gun, which impinge on the red, green, or blue phosphors of the respective pixels on the monitor screen. The problem is the monitor brightness increases nonlinearly with the voltage. Hence the contrast at high pixel values is greater than at low pixel values (dark areas, shadows, etc). Therefore it is necessary to spread out the low values, and compress the high values. This is the purpose of a simple gamma correction block. Unfortunately, such a block amplifies those differences that are associated with noise at the low level end. In particular, spurious color points can appear in the gamma-corrected image in the dark areas. Gamma correction 700 avoids this effect, while retaining correct color in the bright areas, and improving the contrast in the dark areas. Via path 704, 705, and 706, R, G, and B are input to luminance conversion 708 and power law contrast enhancement 720. Luminance conversion 708 calculates luminance Y 710, which is another input to power law contrast enhancement 720. Power law contrast enhancement 720 calculates R', G', B' and Y' which are fed to mix 730 via paths 721, 722, 723, and 724 respectively. Luminance conversion is one part of a well known linear color space conversion from RGB to YCC. A common technical equation is Y=0.299*R+0.587*G+0.114*B, but the precise relationship is not important here.

This conversion places all the detailed spatial and brightness information into the Y, or luminance, component. Power law contrast enhancement is the simple way to correct contrast to match an output device such as a CRT monitor. The power law function is normally applied to R, G, and B. Using R as an example, R'=255*(R/255)^(1/gamma), where gamma is >1 and usually <2. This function is then applied to R, G, and B. In addition, this function is also applied to Y, so as to obtain Y'. The output of the gamma block, R", G", B", and Y", is a mixture of R', G', B' and Y'. More specifically, MIX 730 takes R', G', B', and Y' and mixes them to produce R", G", B", and Y". That is, R" is a mixture of R' and Y', and similarly for B" and G". The mixture favors Y' at low values Y, and favors R' and large values of Y. Hence at large values of Y, the output is similar to that of the prior art. But at lowest values of luminance, the value of Y will dominate all three colors. This mixture is accomplished by the mixing block. The output of mix 730 is R", G", and B" which is fed via paths 731, 732, and 733 respectively, to output to color space conversion 740.

In FIG. 8, progressive edge enhancement 800 is described. Edges are classified with respect to sharpness. Progressive edge enhancement 800 improves the image for viewing, by mildly sharpening less-defined edges, while progressively sharpening well-defined features. Clear details are then improved by amplification, while low-level details or random noise in smooth areas are left unamplified or even smoothed. Progressive edge enhancement 800 also improves the image by automatically reducing edge amplification in darker or shadow areas.

Progressive edge enhancement 800 begins at step 802 where input is received from YCC color correction 156. This input includes luminance Y 803 as well as Cb 804 and Cr 806. Cb contains the blue versus green information. Cr contains the red versus green information. For example, a blue part of the image has a very large value of Cb and a small value of Cr. If it is a light blue, the Y value is large. Dark blue has a small value of Y. Cb 804 and Cr 806 essentially pass through progressive edge enhancement 800 to output to DCT/JPEG 830. Luminance Y is input to high pass filter 810, lookup table m(Y) 816, and the calculation of Y' 820.

High pass filter 810 tests the local image for the presence of an edge or point in the luminosity Y. The edge signal is dY. The high pass filter is known in the art to find edges and points. The product of factor n from block 814 and m from block 816 times edge signal dY is added to the original luminosity Y in step 820 to produce Y' 822:

$Y'=Y+dY*n*m$

Y' 822 is then output to DCT/JPEG 830.

The value of n in progressive edge enhancement 800 depends upon the absolute value of dY, which is written as |dY|. The value of n is smaller for smaller values of |dY| and larger for larger values of |dY|. This means smoother parts of the image are sharpened only a small amount, or even smoothed further, while sharper parts of the image are sharpened further (progressively). Values of n are stored in a look-up table 814 of n(|dY|), which means that n is a function of the absolute value of dY. The value of m in progressive edge enhancement 800 depends on the luminance Y and is smaller for small values of Y. This provides less sharpening in areas of low luminance, such as shadows. Values of m are stored in a look-up table 816 of m(Y), which means that, m is a function of the value of Y.

Figure 9:
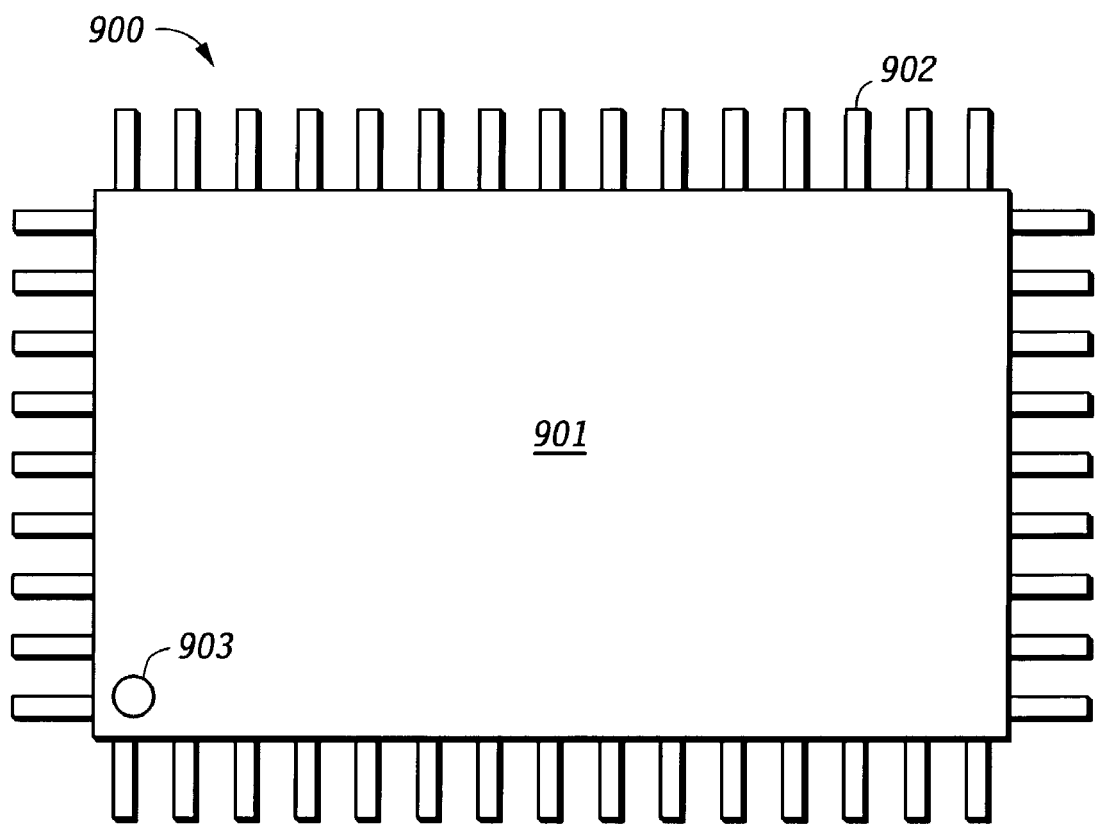
FIG. 9 depicts a semiconductor chip for storing microcode used to execute the flowcharts of FIGS. 2, 3, and 6, as well as the blocks of FIGS. 1, 7, and 8.

The algorithms described in the flowcharts in FIGS. 2, 3, and 6; the blocks in FIGS. 1, 7, and 8; all threshold values T1, T2, and T3; and all look-up tables (LUT) are preferably stored in an information bearing semiconductor chip 900, as shown in FIG. 9. Chip 900 is preferably an application specific integrated circuit (ASIC) chip utilizing CMOS technology. The exterior of chip 900 shows a typically square or rectangular body 901 with a plurality of connectors 902 along the perimeter of body 901. Connectors 902 are preferably electrical but could be optical. There is typically an alignment dot 903 at one corner of chip 900 to assist with the proper alignment of chip 900 on a printed circuit board (PCB) card. Within body 901, chip 900 consists of a number of interconnected electrical elements, such as transistors, resistors, and diodes as well as possible optical-electrical (opto-electrical) components. These interconnected electrical elements are fabricated on a single chip substrate of silicon crystal, or other semiconductor material such as gallium arsenide (GaAs), silicon, by use of photolithography. One complete layering-sequence in the photolithography process is to deposit a layer of material on the chip, coat it with photoresist, etch away the photoresist where the deposited material is not desired, remove the undesirable deposited material which is no longer protected by the photoresist, and then remove the photoresist where the deposited material is desired. By many such photolithography layering-sequences, very-large-scale integration (VLSI) can result in tens of thousands of electrical elements on a single chip. Ultra-large-scale integration (ULSI) can result in a hundred thousand electrical elements on a single chip.

While the invention has been shown and described with reference to a particular embodiment thereof, it will be understood to those skilled in the art, that various changes in form and details may be made therein without departing from the spirit and scope of the invention.

We claim:

1. A method for processing a digital image, comprising the steps of:
   performing an automatic gain control on a photo-sensor output to generate a first image output;
   performing an automatic white balance correction to said first image output to generate a second image output;
   applying white balance to said second image output to generate a third image output;
   performing a color interpolation to said third image output to generate a fourth image output, wherein said color interpolation comprises:
      detecting a diagonal edge where there is a difference in color intensity in both a row and a column of a pixel array, and
      calculating a median color value for a pixel at said diagonal edge;
   performing a low-pass spatial filtration of said fourth image output to generate a fifth image output;
   performing a gamma correction on said fifth image output to generate a sixth image output, wherein said gamma correction comprises using a luminance conversion factor measured from an RGB to adjust said RGB;
   performing a color space conversion of said sixth image output to generate a seventh image output;
   performing a YCC color correction on said seventh image output to generate an eighth image output; and
   performing a progressive edge enhancement on said eighth image and storing said image to a storage device.

2. The method of claim 1, wherein said progressive edge enhancement comprises the steps of:
applying a high pass filter to said eighth image output;
utilizing a look-up table; and
modifying said eighth image output through said lookup table.

3. The method of claim 2, wherein said automatic white balance is comprised of the steps of:
calculating a mean color value; and
applying a sector based weighting to an adjustment to a white balance coefficient.

4. The method of claim 1, further comprising the step of acquiring a Bayer pattern image with a photo-sensor array.

5. The method of claim 4, further comprising the step of regulating the operation of said photo-sensor array with an iterative automatic exposure control algorithm.

6. A method for processing a digital image, comprising the steps of:
providing a first image output from a photo-sensor array;
applying a white balance algorithm to said first image output of said photo-sensor array to form a second image output;
performing a color interpolation to said second image output to generate a third image output;
performing a low-pass spatial filtration of said third image output to generate a fourth image output;
performing a gamma correction on said fourth image output to generate a fifth image output, wherein performing said gamma correction comprises using a luminance conversion factor measured from an RGB to adjust said RGB;
performing a color space conversion of said sixth image output to generate a seventh image output;
performing a YCC color correction and progressive edge enhancement on said seventh image output to generate an eighth image output; and
generating an output file from said eighth image output.

7. The method of claim 6, wherein said color interpolation comprises the steps of:
detecting a diagonal edge where there is a difference in color intensity in both a row and a column of a pixel array; and
calculating a median color value for a pixel at said diagonal edge.

8. The method of claim 6, further comprising the steps of:
acquiring a Bayer pattern image with said photo-sensor array; and
regulating the operation of said photo-sensor array with an iterative automatic exposure control algorithm.

9. A method for processing a digital image, comprising the steps of:
providing a first image output from a photo-sensor array;
applying a white balance algorithm to said first image output of said photo-sensor array to form a second image output;
performing a color interpolation to said second image output to generate a third image output;
performing a low-pass spatial filtration of said third image output to generate a fourth image output;
performing a gamma correction on said fourth image output to generate a fifth image output;
performing a color space conversion of said sixth image output to generate a seventh image output;
performing a YCC color correction on said seventh image output to generate an eighth image output; and
generating an output file from said eighth image output, said method further comprising the step of providing a progressive edge enhancement.

10. The method of claim 9 wherein said progressive edge enhancement comprises the steps of:
applying a high pass filter to said eighth image output;
utilizing a look-up table; and
modifying said eighth image output through said look-up table.

11. A method for processing a digital image, comprising the steps of:
providing a first image output from a photo-sensor array;
applying a white balance algorithm to said first image output of said photo-sensor array to form a second image output, wherein said white balance algorithm comprises:
calculating a median color value; and
applying a sector based weighting to an adjustment to a white balance coefficient;
performing a color interpolation to said second image output to generate a third image output;
performing a low-pass spatial filtration of said third image output to generate a fourth image output;
performing a gamma correction on said fourth image output to generate a fifth image output;
performing a color space conversion of said sixth image output to generate a seventh image output;
performing a YCC color correction on said seventh image output to generate an eighth image output; and
generating an output file from said eighth image output.

12. A digital image processing system comprised of:
a photo-sensor array;
an automatic gain control system to boost an output of said photo-sensor array;
an automatic white balance system coupled to said automatic gain control;
a color interpolation system to improve the resolution of said digital image coupled to said automatic white balance;
a low-pass spatial filter coupled to said color interpolation system;
a gamma correction system coupled to said low-pass filter, wherein said gamma correction system uses a luminance conversion factor measured from an RGB to adjust said RGB;
a color space conversion system coupled to said gamma correction system;
a YCC color correction system coupled to said space conversion system; and
a progressive edge enhancement system coupled to said YCC color correction system.

13. The system of claim 12, wherein said color interpolation system is comprised of means to detect a diagonal edge where there is a difference in color intensity in both a row and a column of a pixel array; and
means to calculate a median color value for a pixel at said diagonal edge.

14. The system of claim 12, wherein said progressive edge enhancement system is comprised of:
means to apply a high pass filter to an output of said YCC color correction system;
means to utilize a look-up table; and
means to modify said output of said YCC color correction system.

15. The system of claim 14, wherein said automatic white balance system is comprised of:
- means to calculate a mean color value; and
- means to apply a sector based weighting to an adjustment to a white balance coefficient.

16. The system of claim 12, further comprising an automatic exposure control coupled to said photo-sensor array.

* * * * *

UNITED STATES PATENT AND TRADEMARK OFFICE
CERTIFICATE OF CORRECTION

PATENT NO. : 7,236,190 B2 Page 1 of 1
APPLICATION NO. : 10/284661
DATED : June 26, 2007
INVENTOR(S) : Arnold W Yanof It is certified that error appears in the above-identified patent and that said Letters Patent is hereby corrected as shown below:

On the Cover Page, Under "Inventors", Line 4:
Change "Adby, Gilbert, AZ (US)" to --Abdy, Gilbert, AZ (US)--

Signed and Sealed this

Fifth Day of August, 2008

JON W. DUDAS
*Director of the United States Patent and Trademark Office*